United States Patent [19]
Fechner

[11] Patent Number: 6,167,496
[45] Date of Patent: Dec. 26, 2000

[54] DATA STREAM OPTIMIZATION SYSTEM FOR VIDEO ON DEMAND

[75] Inventor: Jimmy R. Fechner, Lafayette, Colo.

[73] Assignee: Storage Technology Corporation, Louisville, Colo.

[21] Appl. No.: 09/025,167

[22] Filed: Feb. 18, 1998

[51] Int. Cl.[7] ..................................................... G06F 12/00
[52] U.S. Cl. .......................... 711/168; 711/147; 711/150; 711/100
[58] Field of Search ....................... 348/61, 552; 711/118, 711/113, 114; 707/10, 104, 231, 218, 219

[56] References Cited

U.S. PATENT DOCUMENTS

| | | | |
|---|---|---|---|
| 4,468,730 | 8/1984 | Dodd et al. . | |
| 4,536,836 | 8/1985 | Dodd et al. . | |
| 5,519,435 | 5/1996 | Anderson | 348/8 |
| 5,550,998 | 8/1996 | Willis et al. . | |
| 5,583,994 | 12/1996 | Rangan | 709/219 |
| 5,586,264 | 12/1996 | Belknap et al. | 709/219 |
| 5,701,582 | 12/1997 | DeBey | 345/328 |
| 5,732,239 | 3/1998 | Tobagi et al. | 711/114 |
| 5,938,734 | 8/1999 | Yao et al. | 709/232 |
| 5,956,747 | 9/1999 | Wilhelm et al. | 711/140 |

*Primary Examiner*—John W. Cabeca
*Assistant Examiner*—Fred F. Tzeng
*Attorney, Agent, or Firm*—Wayne P. Bailey; Duft, Graziano & Forest

[57] ABSTRACT

The present data storage subsystem includes a data stream optimization system that optimizes its data throughput performance for a particular type of data that is stored therein, such as video on demand data. The data stream optimization system manages the retrieval of the stored video data to more efficiently use the cache memory. This is accomplished by creating a data stream entry into a table for each viewer that requests access to a stored video file. The data stream optimization system also records the storage extent of each video file so that the identity of the next successive segment of the video file that is being accessed is known. The data stream optimization system monitors the amount of data stored in the cache memory for each of the data streams and identifies the next of these data streams that requires replenishment. The data stream optimization system then accesses the next segment of this video file to ensure that adequate data is stored in the cache memory for the uninterrupted viewing of this video file.

10 Claims, 4 Drawing Sheets

| DATA STREAM | DS1 | DS2 | DS3 | DS4 | DS5 | DS6 | DS7 |
|---|---|---|---|---|---|---|---|
| MODE | PLAY | PLAY | FAST FORWARD | PLAY | REWIND | PLAY | PAUSE |
| PROGRAM | 115 | 23 | 45 | 22 | 67 | 87 | 115 |
| SUBSCRIBER | 100-3 | 100-1 | 100-45 | 100-n | 100-34 | 100-9 | 100-22 |
| TOP | B5 | | B46 | B77 | B44 | B17 | B56 |
| | B6 | | B47 | B78 | B43 | B18 | |
| | | | B48 | B79 | | B19 | |
| BOTTOM | B7 | | B49 | | B42 | B20 | B57 |

FIG. 3

DATA STREAM OPTIMIZATION SYSTEM FOR VIDEO ON DEMAND

FIELD OF THE INVENTION

This invention relates to data storage subsystems and, in particular, to a data storage subsystem that optimizes its data throughput performance for a particular type of data that is stored therein, such as video-on-demand data. A data stream optimization system for managing the cache memory of the data storage subsystem is implemented to optimize the concurrent retrieval of the data that comprises the desired video selections for a plurality of viewers.

PROBLEM

It is a problem in data storage subsystems to optimize the retrieval of data from the data storage medium for use by a requesting data processor. A data storage subsystem is typically optimized for a particular narrowly defined class of data access patterns to thereby speed up the data retrieval process and reduce the time the processor must wait for data. The data that is typically requested by the processor comprises data files of modest extent of very small extent transaction-based data records. The data storage subsystem therefore is typically optimized to store and retrieve data files that contain computer data and have a modest extent. In a video on demand application, the viewers data access patterns are somewhat predictable, but these requests produce an atypical load for a data storage subsystem, since data storage subsystems are optimized for database or data processing applications. The data files managed by the data storage subsystem comprise data files having an extent an order of magnitude greater than the typical data file for a data processing application.

The video on demand environment comprises the use of a large capacity data storage subsystem to store the digital data that represents a plurality of video selections. Subscribers typically request access to video selections on a random basis, with each access request representing a large data transfer. The subscribers operate independently and their random I/O requests require the data storage devices that comprises the data storage subsystem to frequently reposition the data read heads to different data localities within a file system at indeterminate times. When the read head is positioned at a selected segment of a data file, the I/O request is served and a large quantity of data is read to a buffer. The quantity of data read by the data storage subsystem is selected to provide each viewer with a sustained viewing capability, even though different viewers request access to the same program at different times. The size of the I/O is somewhat dictated by the size of the data file and the need to provide a viewer with uninterrupted viewing while the video-on-demand system decodes the compressed data. In addition, the viewer can fast forward the video selection and the buffer must contain sufficient data to serve such a request. Furthermore, the sequentiality of the data retrieval must be bidirectional, in that the viewer can rewind the video selection rather than simply viewing the video selection in a forward direction at a predictable rate of viewing.

The data access patterns exhibited by a video on demand system therefore lie somewhere between an independent access, random access pattern (RAID5-like) and a sequential, parallel access data access pattern (RAID3-like). This dichotomy is due to the nature of video on demand, with the I/O request distribution, with respect to file locality and time, exhibiting both sequential and random characteristics, yet the I/O of the data typically occurs in fixed, large size segments. Many video on demand systems use a very large cache memory to provide the buffer capacity to improve the sequential file performance. However, the randomness of the incoming requests minimizes the effectiveness of the cache and the cache prediction algorithms presently in use are ineffective to address this data access pattern.

Thus, the problem with existing data storage subsystems is that they are not optimized for the storage and retrieval of video on demand data. Therefore, the inefficient use of the data storage subsystem and associated cache apparatus is endured, even though such inefficiencies are costly.

There are existing data stream sequentiality detection systems for use in cache memory systems. One of these systems is disclosed in U.S. Pat. Nos. 4,468,730 and 4,536,836, and comprises a cache management system that detects the presence of a sequential data stream without the involvement of the host processor. In this system, the host processor fails to provide cache hints and the cache management system in response to the host processor requesting a data record from the disk memory, therefore also prestages the next sequential data record from the disk memory except where the cache management system detects that the requested record is not part of a sequence of data records. A data storage system is disclosed in U.S. Pat. No. 5,550,998 and comprises a disk array read/write management system that anticipates the location of the next data record to be read/written based upon the read/write location determination algorithm in use in the disk array. Thus, by knowing the pattern of read/write data storage location selections executed by the disk array system, the read/write management system can position the read/write heads at the memory location that the data storage system is likely to select.

SOLUTION

The above described problems are solved and a technical advance achieved by the present data storage subsystem which includes a data stream optimization system that optimizes its data throughput performance for a particular type of data that is stored therein, such as video on demand data. The data stream optimization system manages the retrieval of the stored video data to more efficiently use the cache memory. This is accomplished by creating a data stream entry into a table for each viewer that requests access to a stored video file. The data stream optimization system also records the storage extent of each video file so that the identity of the next successive segment of the video file that is being accessed is known. The data stream optimization system monitors the amount of data stored in the cache memory for each of the data streams and identifies the next of these data streams that requires replenishment. The data stream optimization system then accesses the next segment of this video file to ensure that adequate data is stored in the cache memory for the uninterrupted viewing of this video file.

BRIEF DESCRIPTION OF THE DRAWING

FIG. 3 illustrates a typical data stream management table for use in the present data stream optimization system for video on demand data.

DETAILED DESCRIPTION

Figure 1:
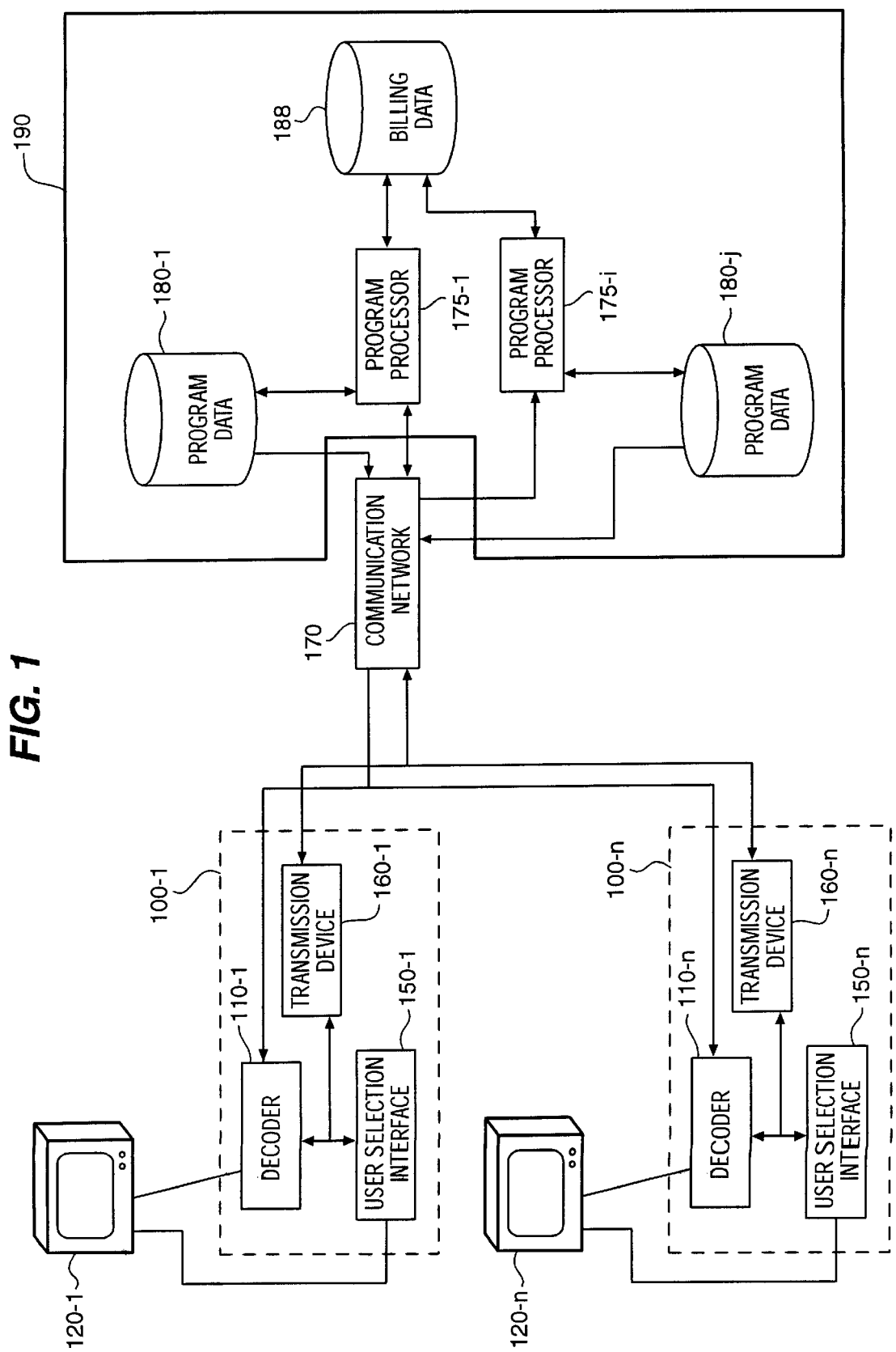
FIG. 1 illustrates the architecture of a typical video on demand system, including the data storage subsystem that stores the program material as well as the present data stream optimization system for video on demand data.

The overall architecture of a video-on-demand system is illustrated in block diagram form in FIG. 1. The subscribers of the video-on-demand system 190 comprises a large number of subscribers, each of whom is equipped with a one of the video viewing devices 120-1 to 120-n. The video viewing devices 120-1 to 120-n are connected to a data communication network 170, such as a cable television link or satellite communication system, by means of a corresponding one of interface devices 100-1 to 100-n, termed a "set top box." The communication network 170 is connected at the other end to the video-on-demand system 190, which functions to provide the program material for viewing by the subscribers.

The delivery of the program materials is on a subscriber selected basis, wherein a subscriber selects a desired video program from a predetermined list of available program materials that can be delivered to the subscriber by the video-on-demand system 190. Thus, there is a two-way communication that takes place between the subscriber and the video-on-demand system 190, with the video-on-demand system 190 transmitting program selection material to the subscriber via the subscriber's set top box 100-1 decoder 110-1 and video viewing device 120-1. The subscriber then enters a program selection via a data input device 150-1 associated with the set-top-box 100-1, which selection is transmitted via the communication network 170 to the video-on-demand system 190. The video-on-demand system 190, upon receipt of the subscriber's program selection data, routes the selection to a one of the program processors 175-1 to 175-I which retrieves the requested program material from the data storage subsystem 180-1 to 180-j to which it is connected and records subscriber billing data into the billing database 188.

As shown in FIG. 1, it is common for a large number of subscribers to be interconnected to a plurality of program processors 175-1 to 175-I, which in turn are interconnected with at least one, and more likely a plurality of data storage subsystems 180-1 to 180-j. The program materials are stored on rewriteable media in the data storage subsystems 180-1 to 180-j, being input via a data input apparatus (not shown). A typical implementation comprises the use of a RAID data storage subsystem, which comprises a plurality of disk drives which are interconnected to provide a high bandwidth data I/O capacity. The program material input device comprises a tape drive, or video-disk drive, which receives the program material on a mountable medium and reads the program material from this element and stores the program material in a selected location in the data storage subsystem 180-1 to 180-j. The identity of the program material and its data storage location in the data storage subsystem 180-1 to 180-j are maintained by the program processors 175-1 to 175-I, which regulates the retrieval of the program materials requested by the subscribers. The data storage subsystem 180-1 to 180-j does not have any knowledge of the content of the program materials, the beginning and end points of each data file which comprises the program material, the identity of the subscribers. The data storage subsystem 180-1 to 180-j simply retrieves a segment of a data file when requested by the program processor 175-1 to 175-I. Thus, to improve the performance of the data storage subsystem 180-1 to 180-j is a difficult task, since the data storage subsystem 180-1 to 180-j can only address the focussed aspects of the data retrieval task.

Data Stream Optimization Function

Figure 4:
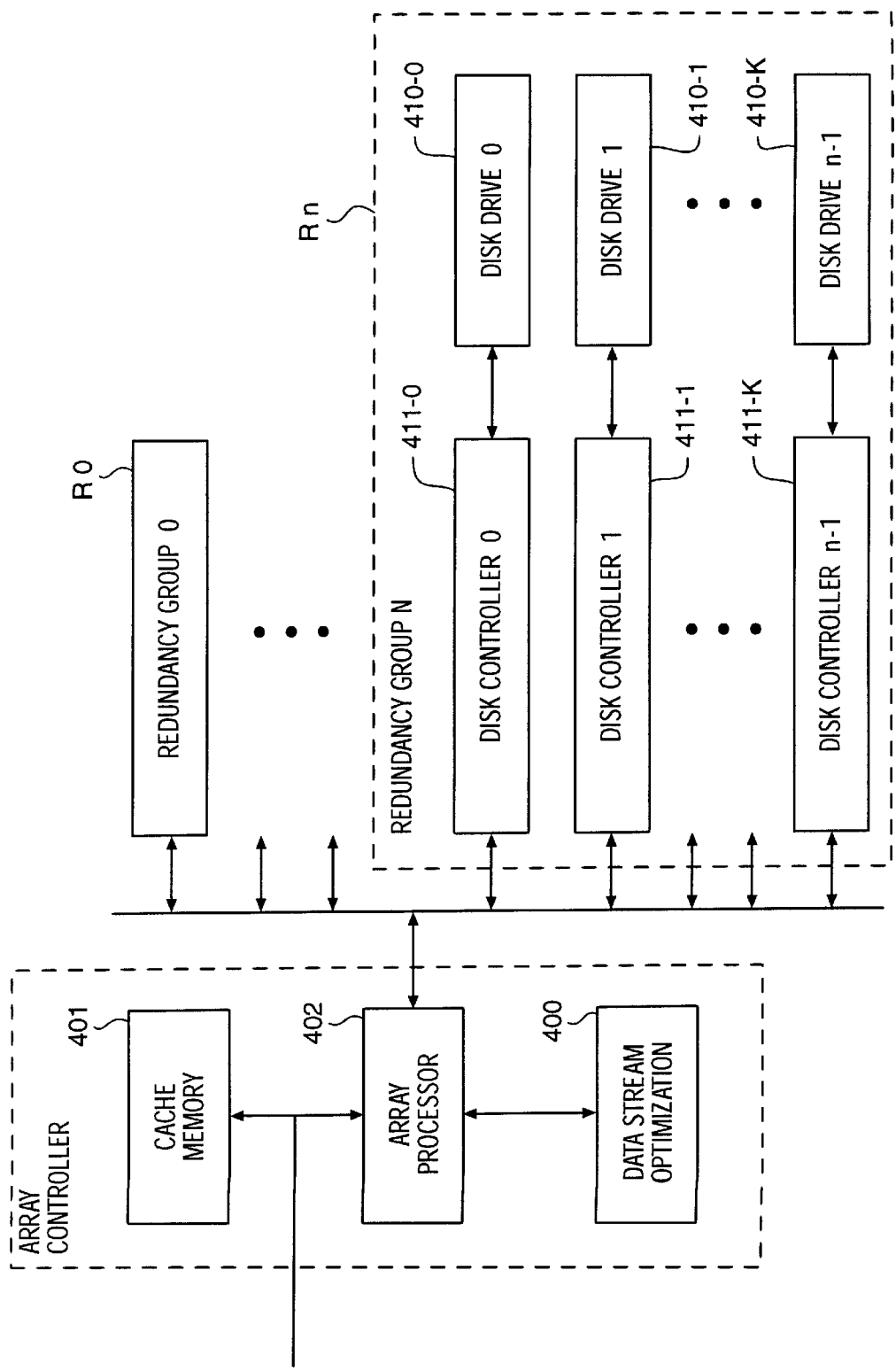
FIG. 4 illustrates in block diagram form additional details of the data storage subsystem that includes the present data stream optimization system for video on demand data.

FIG. 4 illustrates in block diagram form additional details of the data storage subsystem 180-1 that includes the present data stream optimization system 400 for video on demand data. The data storage subsystem 180-1 comprises a disk drive array (RAID) data storage subsystem that stores data on a plurality of redundancy groups R0-RN, each containing a plurality of disk drives 410-1 to 410-k and their disk controllers 411-0 to 411-k according to a data storage philosophy that enables the array of disk drives to emulate the function of a large disk drive. The basic characteristics of the video-on-demand data is that there are multiple concurrent data streams, one for each subscriber who is being served by the data storage subsystem 180-1. In order to increase the efficiency of operation of the video-on-demand system 190, it is important to maximize the number of uninterruptable data streams that can be produced by the data storage subsystem 180-1. In this regard, the present data stream optimization system 400 is implemented by the processor 402 of the data storage subsystem 180-1 and functions to adjust the precaching of data from the backend disk drives 410-1 to 410-k to the cache memory 401 of the data storage subsystem 180-1 to create an uninterrupted data stream for the subscribers. By adjusting the performance of the data file precaching operation, the data stream optimization system 400 can maximize the number of subscribers served for the size of cache memory 401 provided, while maintaining sufficient data in the cache memory 401 to avoid exhaustion of any data stream provided to the subscribers.

In the particular application noted herein of video-on-demand data, the video program material is very predictable in that is a fixed quantity of data for a selected program and of certain characteristics, for example: the data file is sequential in nature and comprises n data blocks. However, the subscribers can pause, fast forward, rewind, and each data stream is therefore not extinguished at a uniform and predictable rate. For example, when the subscriber fast forwards a data file, every nth frame is retrieved and transmitted to the subscriber for viewing to thereby enable the subscriber to proceed quickly through the program without undue delay. The data stream optimization system 400 must therefore balance the need to read ahead to retrieve data and the need to not deplete the data that is stored in the cache memory 401 so that the data stream transmitted to the subscriber is not interrupted. To maintain the uninterruptable nature of the transmission, the architecture of the disk drive array is preferably a RAID 3—all disks in parallel, not transaction oriented. The data storage subsystem 180-1 can use mirrored disks avoid bad data since the reconstruction of data effects video view by introducing delay and distortion.

Method of Operation of the Data Stream Optimization Function

Figure 2:
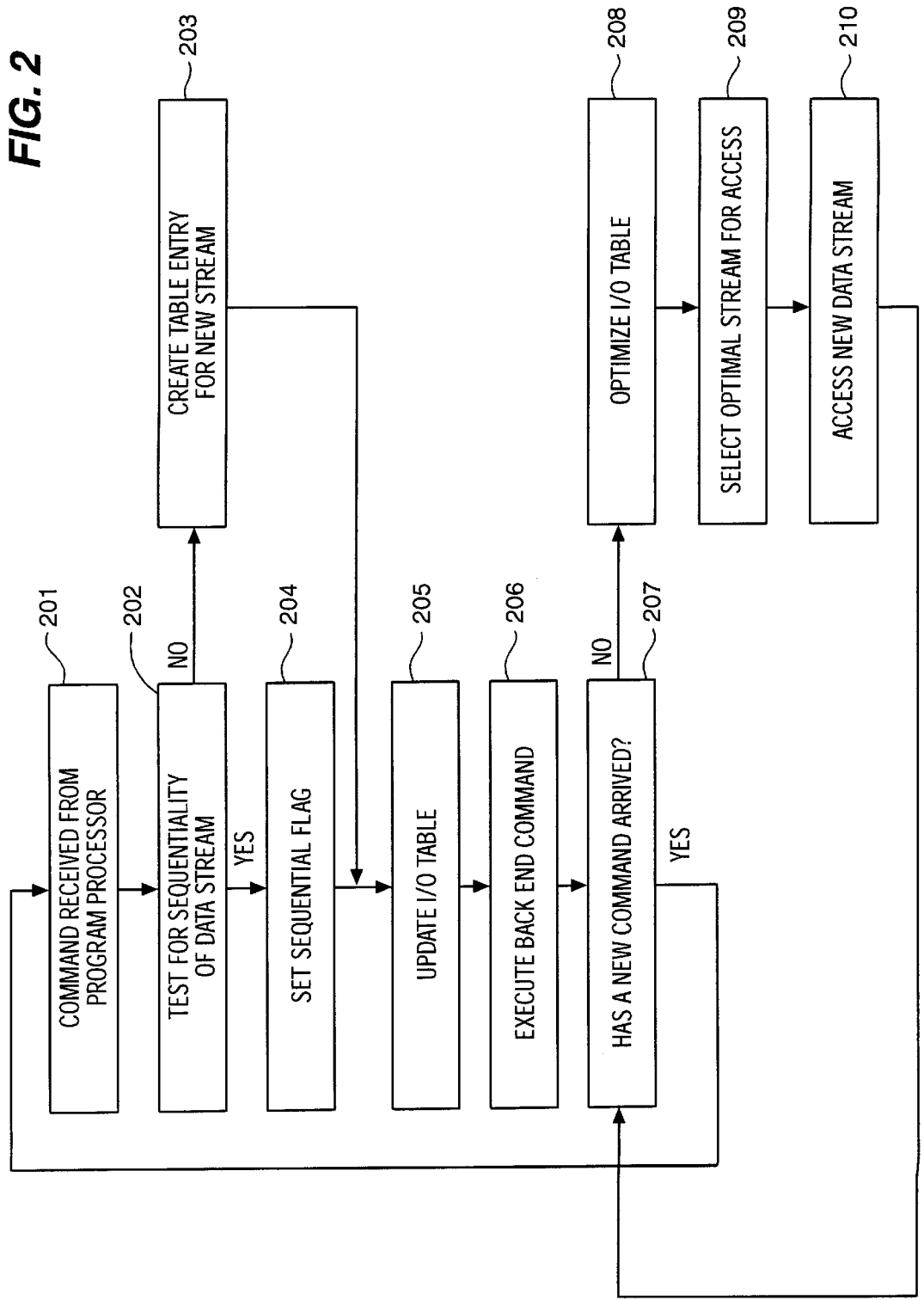
FIG. 2 illustrates in flow diagram form the operation of the present data stream optimization system for video on demand data.

The operation of the present data stream optimization system for video on demand is illustrated in flow diagram form in FIG. 2 and FIG. 3 illustrates typical data that is stored in the Input/Output table that is used to manage the cache memory 401. The process is initiated at step 201 when the program processor 175-1 transmits a command to the data storage subsystem 180-1 to retrieve a block of data. At step 202, the data stream optimization system 400 tests the data request for sequentiality by activating a sequentiality determination algorithm. The sequentiality detection algorithm reviews the "Subscriber" and "Program" entries in the Input/Output table to determine whether the requesting subscriber has already requested the selected program. In the video-on-demand system 190, each request that is received from the program processor 175-1 is either a new data stream or an addition to an existing data stream. Therefore, if the test for sequentiality fails, processing advances to step 203 where the data stream optimization system creates a new table entry, such as DS2, for the presently received data file request, defining this request as the beginning of a new data stream to access program 23 for the requesting subscriber 100-1. Once this is accomplished, processing advances to step 205 where the Input/Output table is updated to contain the entries shown in FIG. 3. If the test for sequentiality does not fail at step 202, processing advances to step 204 where the data stream optimization system 400 sets the sequentiality flag indicating that the received request is part of a sequential data stream which is represented in the Input/Output table. At step 205, the data stream optimization system updates the Input/Output table to indicate the nature of the present request.

At step 206, the processor 402 executes the received command. For the purpose of this description, assume that the subscriber at video viewing device 120-n is viewing program 22 and the associated set top box 100-n has determined that the quantity of program material presently stored in the set top box 100-n has fallen below a predetermined threshold. The set top box 100-n is the element that initiates the request for a block of data, which request is the request presently being processed. Therefore, the data storage subsystem 180-1 transmits the requested block of data B77 from the cache memory 401 to the requesting program processor 175-1 for transmission to the requesting subscriber at set top box 100-n. If the requested data block is not presently stored in the cache memory 401, the processor 402 executes a back end command to read the requested data block from the disk drives 410-1 to 410-k to thereby make the data available to the requesting program processor 175-1 for transmission to the requesting subscriber. Processing then advances to step 207 where the processor 402 determines whether a new command has arrived. If so, processing returns to step 201 as described above.

Data Stream Selection

If a new command is not received at step 207, then the data stream optimization system 400 proceeds to execute the cache memory optimization routine to maintain an optimal amount of data in cache memory 401 for each of the plurality of concurrently active data streams DS1–DS7. At step 208, the data stream optimization system 400 optimizes Input/Output table by expunging any data streams that have not been active for a predetermined amount of time. The data stream optimization system 400 also determines whether a particular subscriber has more than one data stream extant and, if so, expunges the oldest data streams from the Input/Output table to maintain only a single data stream for each subscriber. Once the Input/Output table has been optimized, the data stream optimization system 400 proceeds to step 209 where it selects an optimal data stream for access. This determination is made to maintain a reasonable amount of data in the cache memory 401 for each data stream.

In the example set of data illustrated in FIG. 3, there are a number of concurrently active data streams DS1–DS7. These data streams DS1–DS7 can be segmented by "MODE" which defines the speed at which the data stored in cache memory 401 is being depleted for this data stream. Thus, data streams DS3 and DS5 are in the "Fast Forward" and "Rewind" modes, respectively. These modes generally are serviced by presenting every nth video frame to the subscriber to thereby minimize the data transmission requirements and enable the program material to be scanned at a rapid rate. If both of these modes operate at the same nth frame viewing rate, then the cache management process can treat both modes equally. In this instance, the data stream DS5 contains less data in the cache memory than the data stream DS3 and would therefore be replenished first. As can be seen from FIG. 3, data stream DS3 contains four blocks of data in the cache memory 401 and if this is the maximum quantity of data allotted for a data stream, then the processing would advance to address the next successive mode in terms of data transfer requirements. The data streams DS1, DS2, DS4, DS6 are in the "Play" mode and output data blocks at a predefined rate to the associated set top box for processing to display the program materials contained therein to the subscriber. This mode is the second mode in terms of priority of servicing among the various operational modes. Thus, among these data streams, data stream DS6 has the greatest amount of data stored in cache memory 401 and is therefore last in the priority list for replenishment. Data streams DS1 and DS4 are both equal in the amount of data stored in cache memory 401 and are therefore the next two (higher) in the priority list for replenishment. However, data stream DS2 only has two blocks of data stored in cache memory 401 and is therefore the highest priority of the "Play" mode data streams in need of replenishment. The remaining categories of operation are: Pause, Fast Forward, Rewind. The Pause mode requires no servicing until the subscriber activates one of the viewing or repositioning modes. Therefore, the Pause mode is typically the lowest priority mode to be processed.

The use of a prediction step, such as that noted above, enables the data stream optimization system 400 to determine the next data stream served by the cache memory 401 that will require replenishment. The cache memory is typically divided into 512K buffers to enable a steady stream of data to be transmitted to the subscribers and to enable the data staging from the disk drives to be effected in an efficient manner. The relationship among the modes in terms of ascertaining the priority of data stream processing can be more complex than that described above, since it can be seen that data stream DS2 in the Play mode only has two blocks of data remaining and may require processing at least as soon as the selected data stream DS5. However, for the purpose of illustrating the concept of the invention, the simple linear processing model is noted herein. Therefore, using this example, data stream DS5 is the next data stream to be selected for replenishment.

At step 210, the data stream optimization system 400 accesses this newly selected data stream and retrieves at least one data block from the backend disk drives to maintain a predetermined amount of data in the cache memory 401 for each of the plurality of concurrently active data streams. The data stream optimization system 400, upon completing this data transfer, returns to step 207 as described above. The processing of requests and the continual replenishment of the data streams in the cache memory 401 operate to maximize the number of data streams that can be serviced, yet also ensure that no data stream will be exhausted prior to the end of the program.

Summary

Thus, the present data stream optimization system optimizes the data throughput performance of a data storage subsystem for a particular type of data that is stored therein, such as video on demand data. The data stream optimization system manages the retrieval of the stored video data to more efficiently use the cache memory. This is accomplished by creating a data stream entry into a table for each viewer that requests access to a stored video file. The data stream optimization system also records the storage extent of each video file so that the identity of the next successive segment of the video file that is being accessed is known. The data stream optimization system monitors the amount of data stored in the cache memory for each of the data streams and identifies the next of these data streams that requires replenishment. The data stream optimization system then accesses the next segment of this video file to ensure that adequate data is stored in the cache memory for the uninterrupted viewing of this video file.

I claim:

1. A data storage subsystem having a data stream optimization system for efficient retrieval of data files, each of which comprises a plurality of blocks of data, for use by a plurality of subscribers, comprising:

memory means for storing said data files;

cache memory means for storing a plurality of data blocks, retrieved from said memory means, for transmission to requesting ones of said subscribers;

means, responsive to a subscriber requesting access to a selected one of said data files, for creating a data stream to retrieve said data file, in sequential blocks from said memory means through said cache memory means, for transmission to said requesting subscriber; and means for maintaining a plurality of concurrently active ones of said data streams in said cache memory means, wherein said means for maintaining comprises means for monitoring a rate of consumption of each of said data streams from said cache memory means.

2. The system of claim 1 wherein said means for maintaining further comprises:

means for identifying a data stream having a highest priority for replenishment; and means for retrieving a next successive data block from said memory means to said cache memory means to replenish said identified data stream.

3. The system of claim 1 wherein said means for monitoring comprises:

means for segmenting said plurality of data streams into a plurality of classes, each of which contains data streams of like data transmission requirements; and means for sequencing through said plurality of classes in a predetermined order to service data streams contained in said plurality of classes.

4. The system of claim 3 wherein said means for maintaining further comprises:

means for expunging a data stream in response to absence of use of said data stream for greater than a predetermined amount of time.

5. The system of claim 3 wherein said means for maintaining further comprises:

means, responsive to a plurality of data streams being designated for a single subscriber, for expunging at least one oldest of said data streams.

6. A method for data stream optimization for efficient retrieval of data files, each of which comprises a plurality of blocks of data, from a data storage subsystem for use by a plurality of subscribers, wherein said data storage subsystem includes a memory for storing said data files, a cache memory for storing a plurality of data blocks, retrieved from said memory, for transmission to requesting ones of said subscribers, said method comprising the steps of:

transmitting, in response to a subscriber requesting access to a selected one of said data files, for creating a data stream to retrieve said data file, in sequential blocks from said memory through said cache memory, for transmission to said requesting subscriber; and maintaining a plurality of concurrently active ones of said data streams in said cache memory, wherein said step of maintaining comprises monitoring a rate of consumption of each of said data streams from said cache memory.

7. The method of claim 6 wherein said step of maintaining further comprises:

identifying a data stream having a highest priority for replenishment; and retrieving a next successive data block from said memory to said cache memory to replenish said identified data stream.

8. The method of claim 6 wherein said step of monitoring comprises:

segmenting said plurality of data streams into a plurality of classes, each of which contains data streams of like data transmission requirements; and sequencing through said plurality of classes in a predetermined order to service data streams contained in said plurality of classes.

9. The method of claim 8 wherein said step of maintaining further comprises:

expunging a data stream in response to absence of use of said data stream for greater than a predetermined amount of time.

10. The method of claim 8 wherein said step of maintaining further comprises:

expunging, in response to a plurality of data streams being designated for a single subscriber, at least one oldest of said data streams.

* * * * *